United States Patent [19]
Kim et al.

[11] Patent Number: 5,415,360
[45] Date of Patent: May 16, 1995

[54] MAGNETIC TAPE CASSETTE WITH HINGEDLY CONNECTED CLOSURE MEMBERS

[75] Inventors: Kyung-Joon Kim; Han-Chul Lee, both of Chungcheongnam-Do, Rep. of Korea

[73] Assignee: SKC Limited, Suwon, Rep. of Korea

[21] Appl. No.: 112,773

[22] Filed: Aug. 26, 1993

[30] Foreign Application Priority Data

Aug. 28, 1992 [KR] Rep. of Korea ............... 1992-15592

[51] Int. Cl.⁶ ........................................... G11B 23/087
[52] U.S. Cl. ................................................ 242/347.2
[58] Field of Search ............ 242/197, 198, 199, 347.2; 360/132

[56] References Cited

U.S. PATENT DOCUMENTS

| | | | |
|---|---|---|---|
| 3,495,787 | 2/1970 | Wallace | 242/199 |
| 3,653,608 | 4/1972 | Dickens et al. | 242/199 |
| 3,697,014 | 10/1972 | Lowry et al. | 242/197 X |
| 3,873,046 | 3/1975 | Thévenaz | 242/199 |
| 4,019,695 | 4/1977 | Wharam | 242/199 |
| 4,249,710 | 2/1981 | Dobbs et al. | 242/199 |
| 4,453,683 | 6/1984 | Reimer et al. | 242/199 |
| 4,526,330 | 7/1985 | Shimizu | 242/199 |
| 5,248,208 | 9/1993 | Yoshida et al. | 242/197 X |

*Primary Examiner*—Daniel P. Stodola
*Assistant Examiner*—John P. Darling
*Attorney, Agent, or Firm*—William F. Pinsak

[57] ABSTRACT

A magnetic tape cassette of the type allowing insertion and removal of a pair of tape reels without having to disassemble the cassette, comprising: a hollow housing capable of removably accommodating the tape reels, the housing having at least one access opening permitting the insertion and removal of the tape reels into and out of the housing therethrough; and at least one openable closure member hingedly connected to the housing to close the access opening.

6 Claims, 3 Drawing Sheets

MAGNETIC TAPE CASSETTE WITH HINGEDLY CONNECTED CLOSURE MEMBERS

FIELD OF THE INVENTION

The present invention is directed to an improved magnetic tape cassette and, more particularly, to a magnetic tape cassette of the type containing a pair of reels wound with a magnetic tape, a limited length of which may be exposed beyond a perimeter of the cassette for use in a magnetic recording and/or reproducing device.

DESCRIPTION OF THE PRIOR ART

As is well known, a magnetic tape cassette is structured to retain or store therein a pair of tape reels for recording or reproducing various information when employed in a magnetic recording and/or reproducing device such as a video cassette recorder ("VCR").

Such a magnetic tape cassette typically comprises a cartridge or housing which has a lower and an upper cassette casings assembled together for accommodating a pair of reels wound with a magnetic tape. Use of the magnetic tape cassette in a magnetic recording and/or reproducing device requires a tape protector, e.g., a front cover, for preventing the tape exposed beyond the perimeter of the cassette from being damaged or fractured. In addition, the housing normally includes a variety of functional parts, for example, front cover locking mechanism, several tape guides, reel brake mechanism and coil spring.

In case the magnetic tape cassette needs a repair work on the tape reels, therefore, it is rather difficult or cumbersome to disassemble and reassemble the cassette due to the complexity of its structure; and, further, disassembling and/or reassembling of the cassette may cause a damage to the tape and/or any of the parts therein.

SUMMARY OF THE INVENTION

Accordingly, it is an object of the present invention to provide a novel magnetic tape cassette wherein a pair of reels wound with a tape may be introduced and removed with ease and without risking a damage to the tape and/or any of the functional parts.

The above and other objects of the present invention are accomplished by providing a magnetic tape cassette of the type allowing insertion and removal of a pair of tape reels without having to disassemble the cassette, comprising: a hollow housing capable of removably accommodating the tape reels, the housing having at least one access opening permitting insertion and removal of the tape reels into and out of the housing therethrough; and at least one openable closure member hingedly connected to the housing to close the access opening.

In accordance with one aspect of this invention, the housing includes a generally rectangular bottom panel, a front wall extending upward from the frontal edge of the bottom panel, a rear wall extending upward from the backward edge of the bottom panel and a top panel extending in parallel with the bottom panel to interconnect the top ends of the front and the rear walls, thereby defining a pair of first and second access openings at the respective opposite longitudinal ends of the housing, and the closure member mentioned above comprises a first end door hinged to one longitudinal end of the rear wall to close the first access opening and a second end door hinged to the other longitudinal end of the rear wall to close the second access opening.

In accordance with another aspect of this invention, the housing includes a generally rectangular bottom panel, a front wall, a rear wall and a pair of side walls, each of said front, rear and side walls extending upward from the corresponding edges of the bottom panel and terminating at a generally rectangular top opening, and the closure member comprises a pair of wing-shaped closure sections pivotably mounted on a common pivot axis which spans the top opening at a midway of the length of the top opening.

BRIEF DESCRIPTION OF THE DRAWINGS

The above and other objects and features of the present invention will become apparent from the following description of the preferred embodiments given in conjunction with the accompanying drawings in which.

DETAILED DESCRIPTION OF THE PREFERRED EMBODIMENTS

Figure 1:
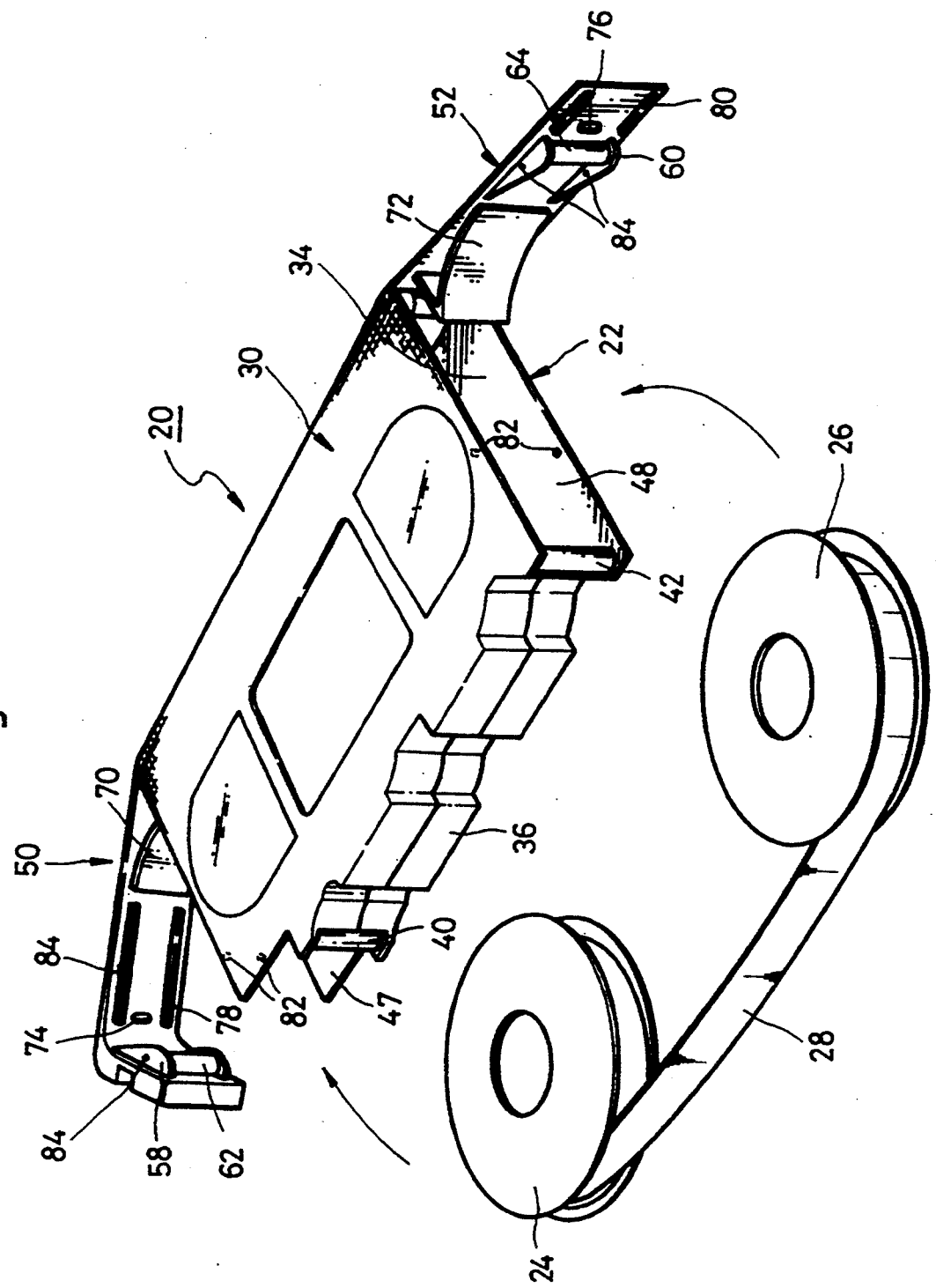
FIG. 1 is a perspective view of the videotape cassette incorporating end doors in accordance with a first embodiment of the present invention, the end doors openable to insert a pair of reels wound with a magnetic tape into the tape cassette.
Figure 2:
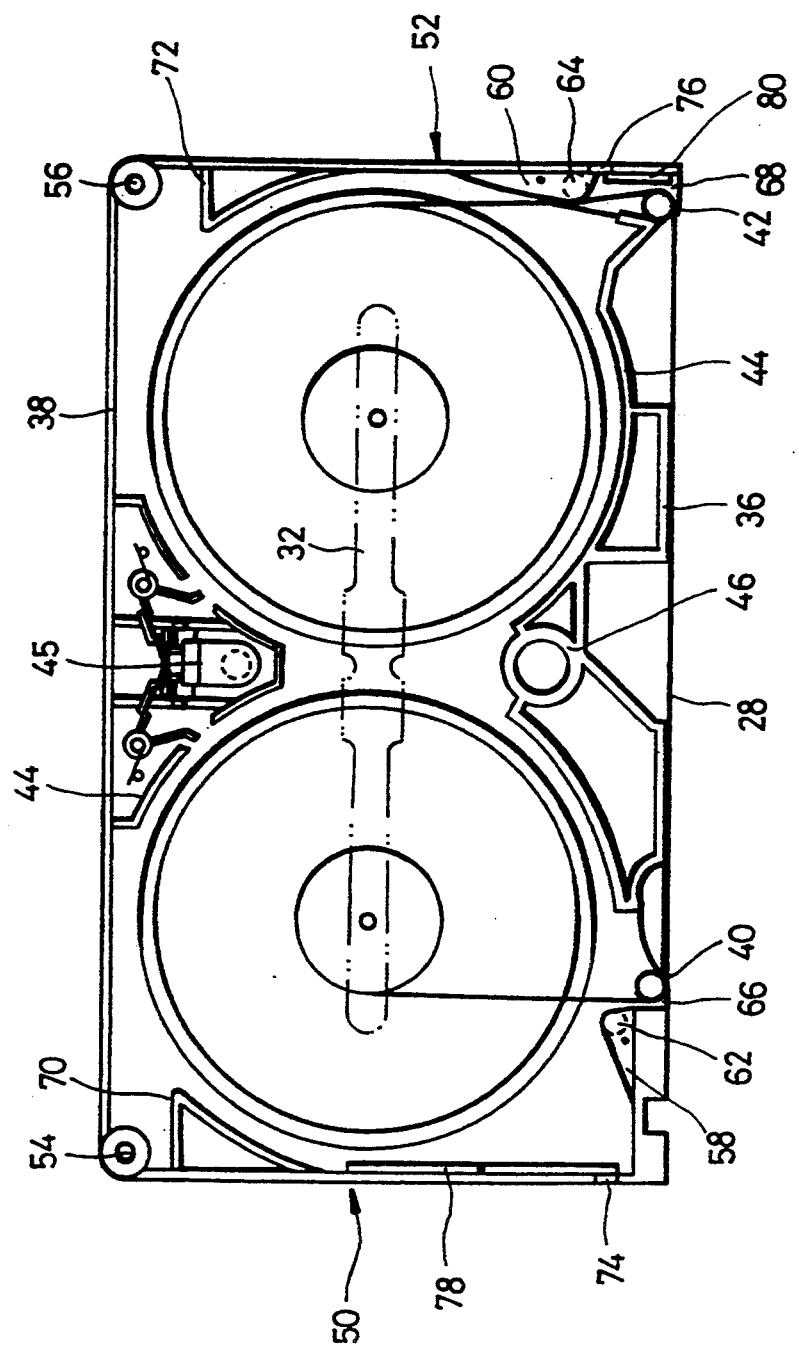
FIG. 2 is a plan view of FIG. 1, with the upper casing eliminated, showing the videotape cassette closed after having received the reels therein.

Referring first to FIGS. 1 and 2, there is shown a videotape cassette, generally designated by reference numeral 20, which is intended for use in a VCR (not shown). The videotape cassette 20 is provided with a lower cassette casing 22 for accommodating therein a pair of reels 24 and 26 wound with a magnetic tape 28 and an upper cassette casing 30 covering them, with the lower and the upper cassette casings constituting together a cartridge or housing. The upper casing 30 may carry a reel spring 32 to ensure that the reels 24, 26 be resiliently biased toward the lower casing 22. The reel spring 32 is preferably bent upwardly at its end portions so that the reels 24, 26 can be inserted into the videotape cassette housing without any interference.

The lower cassette casing 22 is provided with a generally rectangular bottom panel 34 and outer peripheral walls 36 and 38 projecting upwardly from the front and the rear longitudinal edges thereof. The front wall 36 terminates adjacent to a first and a second cylindrical guide rollers 40, 42 which are designed to guide the magnetic tape 28 in a predetermined path as shown in FIG. 2.

As schematically depicted in FIG. 2, the bottom panel 34 further includes a plurality of arc shaped inner walls 44 to confine and stabilize the reels 24, 26 therein. The inner walls 44 are also intended to retain various functional parts, e.g., reel brake mechanism 45. Additionally provided at a longitudinal center of the bottom panel 34 is an annular partition 46 for receiving a light emitter (not shown) located on the bottom of the VCR, which projects a light beam along a desired light beam path, as will be fully set forth below.

It should be noted that the side edges of the lower and upper cassette casings 22, 30 define a first and a second access openings 47, 48 for introducing or removing the pair of reels 24, 26 thereinto or therefrom.

As clearly shown in FIGS. 1 and 2, the access openings 47, 48 are respectively covered by a first L-shaped end door 50 and a second generally rectangular end door 52, each of which is hingedly connected to the housing at 54, 56 so as to allow the pivotal movement thereof.

The first and the second end doors 50, 52 are on their respective distal ends with a pair of noses 58, 60 spaced apart with each other, each pair adapted to receive or retain a first or a second cylindrical guide pin 62 or 64, respectively. As shown in FIG. 2, closing of the end doors 50, 52 permits each guide pin 62 or 64 to lie close by the guide rollers 40, 42 of the lower casing 22, respectively, so that the tape 28 can be guided along a given path extending between the first guide roller 40 and the guide pin 62 and between the second guide roller 42 and the guide pin 64. It should be apparent to the skilled in the art that the distal ends of each of the first and the second end doors 50, 52 do not meet with their adjacent guide rollers 40, 42 so as to form a first and a second clearances 66, 68 for allowing the tape 28 to pass therethrough when the closure members 50, 52 have finished their covering operation of the housing.

Arc shaped inner walls 70, 72 may project inwardly from the end doors 50, 52, which have a similar curvature to the inner walls 44 of the lower casing 22 to define two restricting spaces for the pair of reels 24, 26 in cooperation with each other.

Provided through the thickness of each end door 50 or 52 is a light passage hole 74 or 76 in a faced relationship with one of the light receivers(not shown) located on the opposite side walls of the VCR to assure that a light beam projected from the light emitter protruding from the bottom of the VCR reach one of the light receivers. The light receivers serve to prevent the reels 24, 24 from further rotating at a time when the lengthwise end stretch of a magnetic tape is detected.

In accordance with the present invention, the end doors 50, 52 may include a plurality of longitudinal reinforcement ribs 78, 80 which can engage with the inner lateral edges of the lower and the upper casings 22, 30 as the end doors 50, 52 are closed off. Further, latch means, e.g., lugs 82 bulging from the inner surfaces of the lower and the upper cassette casings 22, 30, and recesses 84 provided on the reinforcement ribs 78, 80 for compensating the lugs 82, may be employed in order for the end doors 50, 52 to be locked onto the lower and the upper casings 22, 30, thereby preventing or minimizing any free opening areas in the end doors 50, 52. Also, the recesses 84 may be positioned on the nose 58 or 60 as shown in FIG. 1.

With the above illustrated arrangement, it is possible to readily insert and remove the pair of reels 24, 26 into and from the videotape cassette housing. That is, loading of the tape reels 24, 26 into the housing can be easily carried out by manual opening of the end doors 50, 52 and subsequent insertion of the reels 24, 26 through the left and right access openings 47, 48. It will be apparent to the one skilled in the art that the reverse process is also likewise simple.

The instant invention further possesses such distinct advantages that the risk of damaging or losing any of the functional parts contained within the videotape cassette is substantially eliminated or minimized and the tape 28 is substantially free from operational damages because the functional parts such as the tape guides 40, 42, 62 and 64 and the reel brake 45 are effectively retained by the upper casing 30 and/or the lower casing 22 having the bottom panel 34 and the inner walls 44.

Figure 3:
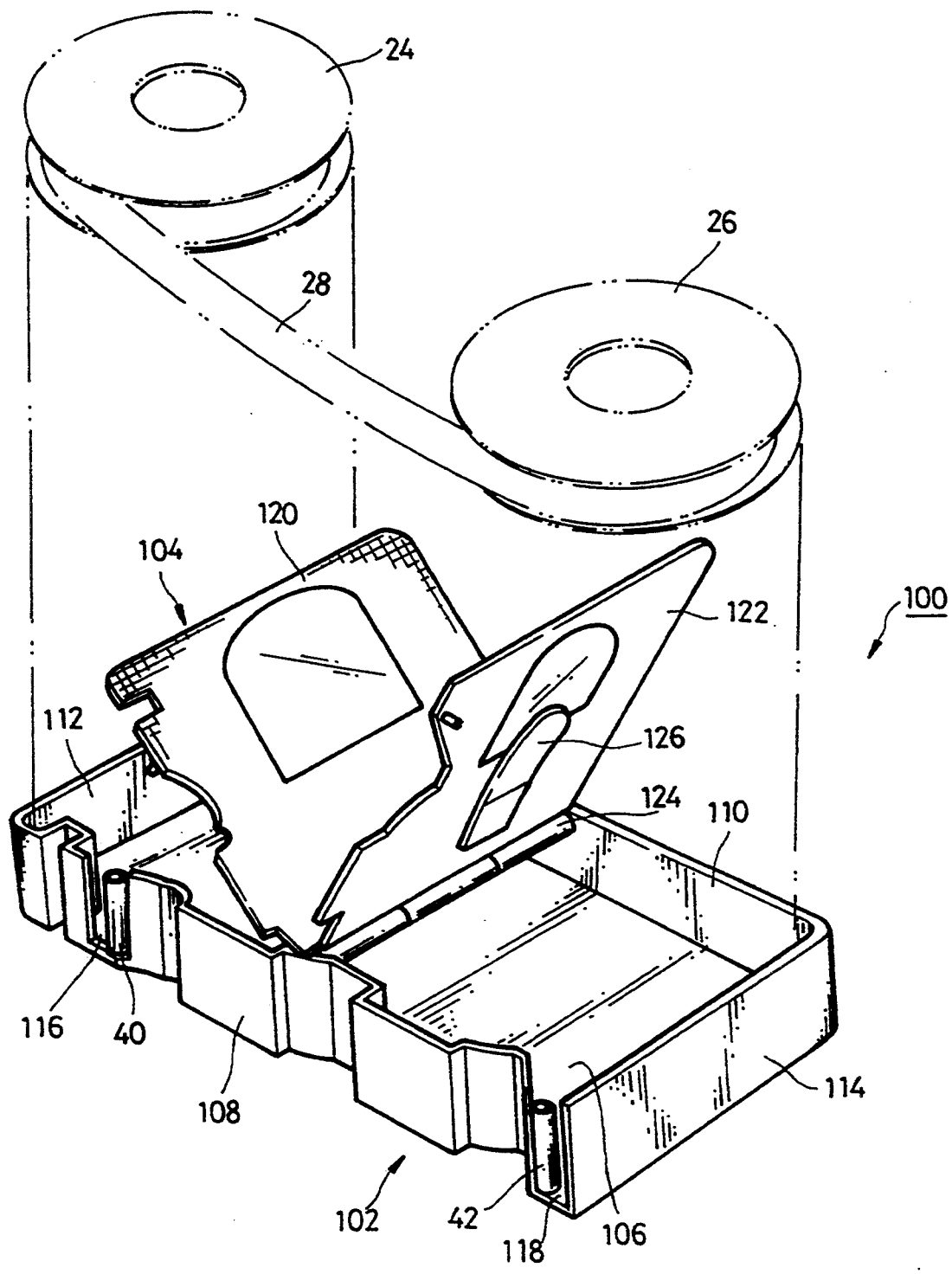
FIG. 3 is a perspective view illustrating another videotape cassette as a second embodiment of the present invention, with the various functional parts placed therein eliminated for the sake of simplicity.

Referring now to FIG. 3, a second embodiment of a videotape cassette, generally designated by reference numeral 100, of the present invention comprises a cassette housing 102 opened upwardly for permitting the insertion and removal of the tape reels 24, 26 thereinto and therefrom and a closure member 104 covering them. In FIG. 3, it should be noted that like reference numerals as used in FIGS. 1 and 2 denote like elements; and the bulk of the functional parts, for example, the reel brake incorporated within the cassette housing, is omitted for the sake of simplicity.

As shown, the cassette housing 102 is provided with a generally rectangular bottom panel 106 and peripheral walls 108, 110, 112 and 114 projecting from the four edges thereof. Provided through the front wall 108 is a left side, upwardly cut-out portion 116 for receiving a first guide roller 40. Further, a second guide roller 42 is also placed in a right side, upwardly cut-out portion 118 defined by the right side wall 114 and the front wall 108. The upwardly cut-out portions 116, 118 permit a tape 28 to extend between the pair of reels 24, 26 and to be guided along the outer surface of the front wall 108 in a given tape path.

As apparent from FIG. 3, the closure member 104 comprises a first and a second closure sections 120, 122 having an outline corresponding to the peripheral walls 108 to 114. The first and the second closure sections 120, 122 are hingedly connected to the housing 102 at 124 to form a wing-shaped openable cover 104. Preferably, each closure section 120 or 122 may carry thereon a reel spring 126 which has a proximal end affixed to the interior surface of the closure section 120 or 122 and a distal free end coming into contact with the reel 24 or 26 when the closure member 104 is in a closed position.

Owing to the above structure, it becomes possible to insert the pair of reels 24, 26 downwardly into the videotape cassette housing 102, in contrast with the structure shown in FIGS. 1 and 2 wherein the pair of reels are inserted toward each other horizontally.

Although the invention has been shown and described with respect to the exemplary embodiments hereof, it should be understood by those skilled in the art that various changes, omissions, and/or additions may be made without departing from the spirit and scope of the invention as defined by the following claims.

What is claimed is:

1. A magnetic tape cassette of the type allowing insertion and removal of a pair of tape reels without having to disassemble the cassette, comprising:

a hollow housing capable of removably accommodating the tape reels, the housing including a generally rectangular bottom panel, a front wall extending upward from a frontal edge of the bottom panel, a rear wall extending upward from a backward edge of the bottom panel and a top panel extending in a parallel relationship with respect to the bottom panel to interconnect top ends of the front and the rear walls, thereby defining at respective opposite longitudinal ends of the housing a pair of first and second access openings which are adapted to permit the insertion and removal of the tape reels into and out of the housing therethrough; and a pair of first and second openable end doors hingedly connected to the housing to close the first and second access openings, the first end door hinged to one longitudinal end of the rear wall to close the first access opening and the second end door hinged to the other longitudinal end of the rear wall to close the second access opening.

2. The magnetic tape cassette as recited in claim 1, wherein first and second guide pins are provided at the respective longitudinal opposite ends of the front wall to guide the tape along a given path.

3. The magnetic tape cassette as recited in claim 2, further comprising means for locking the first and the second end doors in their closed position.

4. A magnetic tape cassette of the type allowing insertion and removal of a pair of tape reels without having to disassemble the cassette, comprising:

a hollow housing capable of removably accommodating the tape reels, the housing including a generally rectangular bottom panel, a front wall, a rear wall and a pair of side walls, each of said front, rear and side walls extending upward from corresponding edges of the bottom panel and terminating at a generally rectangular top access opening which is adapted to permit the insertion and removal of the tape reels into and out of the housing therethrough; and an openable closure member hingedly connected to the housing to close the top access opening, the closure member including a pair of wing-shaped closure sections pivotably mounted on a common pivot axis which spans the top opening at a midway of the length of the top opening.

5. The magnetic tape cassette as recited in claim 4, further comprising a pair of reel springs, each of said springs having a proximal end affixed to the interior surface of the respective closure section and a distal free end coming into contact with the corresponding tape reel when the closure sections are in their closed position.

6. The magnetic tape cassette as recited in claim 5, wherein said front wall has a pair of upwardly extending cutout portions each provided in proximity to the respective side wall to guide the tape in a given path.

* * * * *